Figure 4:
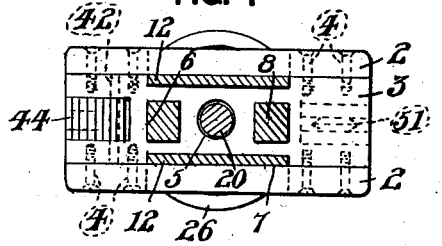

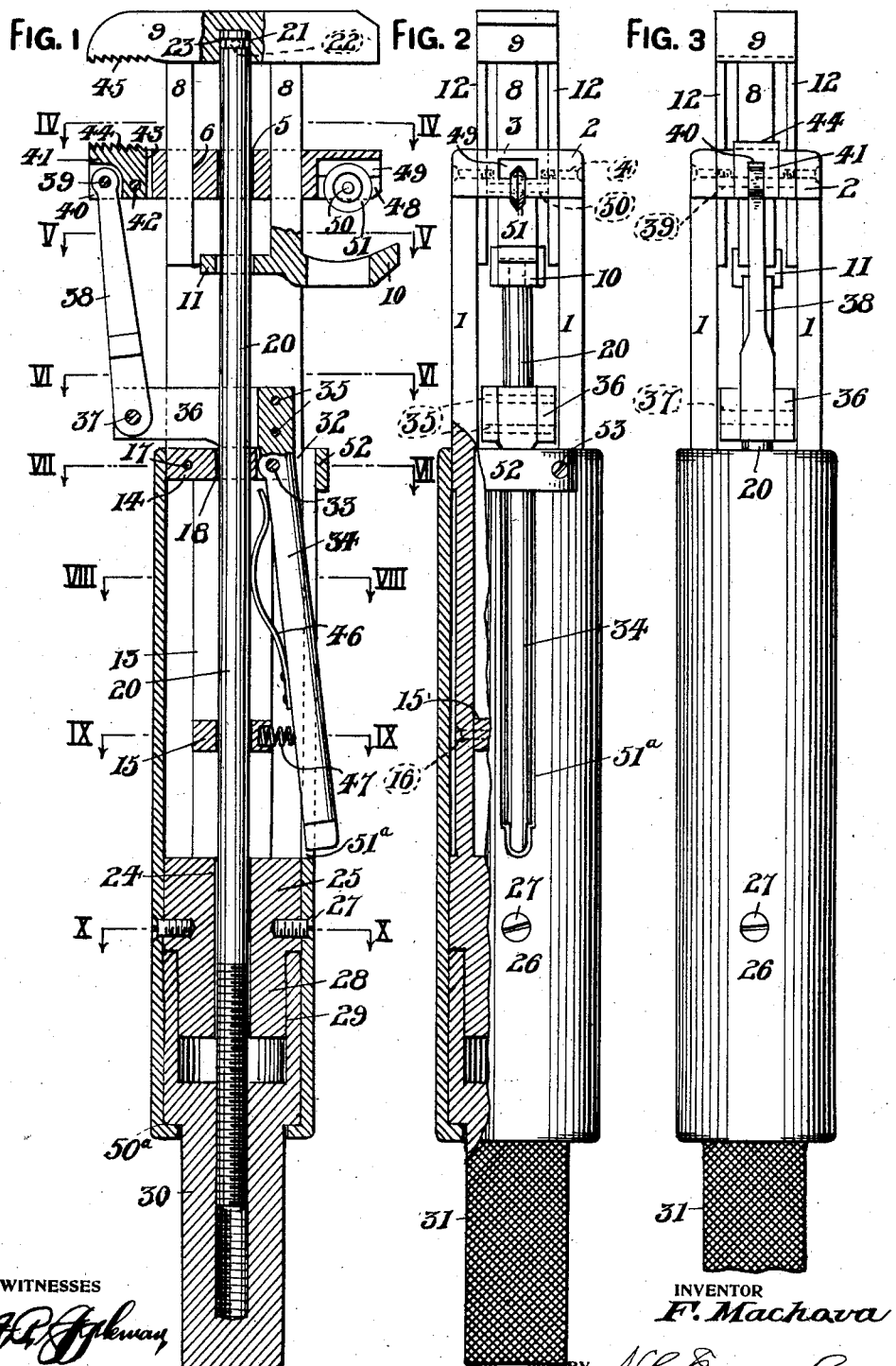

F. MACHAVA.
WRENCH.
APPLICATION FILED OCT. 2, 1911.

1,021,542.

Patented Mar. 26, 1912.

2 SHEETS—SHEET 2.

WITNESSES

INVENTOR
F. Machava
BY
ATTORNEYS

COLUMBIA PLANOGRAPH CO., WASHINGTON, D. C.

UNITED STATES PATENT OFFICE.

FRANK MACHAVA, OF GREENSBURG, PENNSYLVANIA.

WRENCH.

1,021,542.  Specification of Letters Patent.  Patented Mar. 26, 1912.

Application filed October 2, 1911. Serial No. 652,259.

*To all whom it may concern:*

Be it known that I, FRANK MACHAVA, a subject of the King of Hungary, residing at Greensburg, in the county of Westmoreland and State of Pennsylvania, have invented certain new and useful Improvements in Wrenches, of which the following is a specification, reference being had therein to the accompanying drawing.
This invention relates to wrenches, and my invention aims to combine a pipe cutter with a pipe and nut wrench, whereby the tool can be advantageously used by plumbers and other artisans.
The invention further aims to provide a strong and durable wrench that can be easily manipulated.

The invention still further aims to accomplish the above results by a combination of elements that will be hereinafter specifically described and then claimed.

Reference will now be had to the drawing, wherein like numerals denote corresponding parts throughout the several views, in which:—

Figure 7:
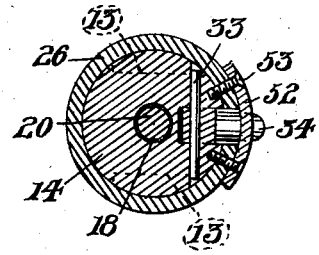
Figure 5:
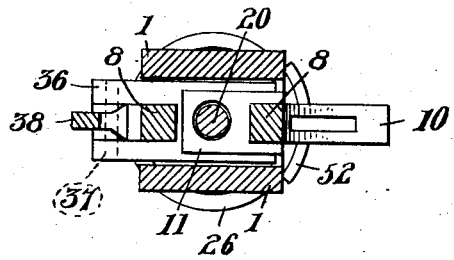
Figure 8:
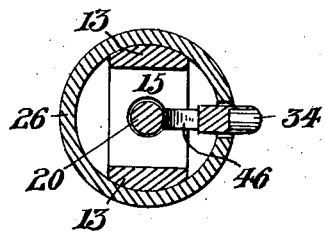
Figure 6:
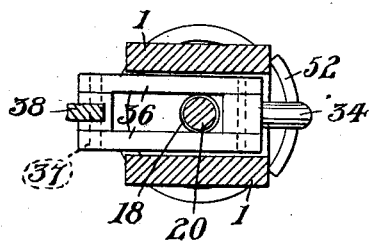
Figure 9:
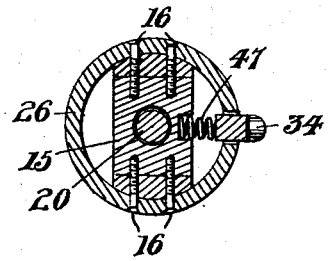
Figure 10:
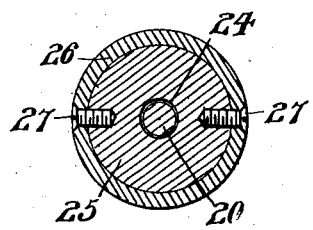

Figure 1 is vertical sectional view of the wrench, Fig. 2 is a front elevation of the same, partly broken away and partly in section, Fig. 3 is a rear elevation of the same, Fig. 4 is a horizontal sectional view taken on the line IV—IV of Fig. 1, Fig. 5 is a similar view taken on the line V—V of Fig. 1, Fig. 6 is a similar view taken on the line VI—VI of Fig. 1, Fig. 7 is a similar view taken on the line VII—VII of Fig. 1, Fig. 8 is a similar view taken on the line VIII—VIII of Fig. 1, Fig. 9 is a similar view taken on the line IX—IX of Fig. 1, and Fig. 10 is a similar view taken on the line X—X of Fig. 1.

A wrench in accordance with this invention comprises two side plates 1 having cross heads 2 and arranged between said cross heads is a jaw block 3, which is secured to said cross heads by screws 4 or other fastening means. The jaw block 3 is provided with a central opening 5, rectangular openings 6 and recesses 7.

Slidably mounted in the rectangular openings 6 are guide bars 8 having the outer ends thereof connected by a double jaw 9. The inner end of one of the guide bars 8 is provided with an outwardly extending slotted support 10 and with an inwardly extending apertured guide 11. The double jaw 9 has depending guide plates 12 that extend through the recesses 7, these guide plates serving functionally also as shields for the guide bars 8.

The inner ends of the side plates are reduced to provide oppositely disposed side arms 13 and connecting said arms are cross heads 14 and 15, the latter being held by screws 16 or other fastening means. The former is riveted or otherwise secured, as at 17 to said arms and both of said cross heads have central openings 18 providing clearance for an adjusting rod 20, the adjusting rod extending outwardly through the guide 11, through the opening 5 of the jaw block 3 into the recess 21 provided therefor in the inner side of the double jaw 9. The outer end of said adjusting rod is rigidly held within the recess 21 by a set screw 22 engaging in an annular groove 23 provided therefor in the outer end of the adjusting rod 20. The inner end of the adjusting rod 20 extends through an opening 24 provided therefor in a block 25, carried by a sleeve 26 inclosing the arms 13. The block 25 is held by screws 27 and the inner end thereof is reduced, as at 28 to accommodate the cylindrical end 29 of a nut 30 screwed upon the threaded end of the adjusting rod. The nut 30 is knurled, as at 31 whereby it can be easily gripped and revolved to adjust the rod 20.

The cross head 14 has an opening 32 and pivotally mounted in said opening by a pin 33 is a lever 34. Connected to the inner end of the lever 34 by rivets 35 are side arms 36 extending between the side plates 1 at opposite sides of the rod 20. Pivotally mounted between the outer ends of the side arms 36 by a pin 37 is a link 38 having the outer end thereof pivotally mounted by a pin 39 in a recess 40 provided therefor in a pivoted gripping jaw 41. The jaw 41 is pivotally mounted by a pin 42 in a slot 43 provided therefor in the jaw block 3. The pivoted jaw 41 has a serrated surface 44 adapted to coöperate with the serrated inner side 45 of the double jaw 9 in gripping a rounded or curved surface.

Secured to the inner side of the lever 34 is a flat spring 46 engaging the rod 20, and interposed between the head 15 and the lever 34 is a coiled compression spring 47, said spring coöperating with the spring 46 in retaining the lever 34 in an extended position with the pivoted jaw 41 lowered. When the lever 34 is pressed upon, the jaw 41 is elevated to firmly grip a pipe or curved surface.

The forward end of the jaw block 3 has the inner side thereof slotted, as at 48 and provided with a cavity 49. Revolubly mounted in the slot 48 by a pin 50 is a cutter wheel 51 that confronts the support 10. It is through the medium of this cutter wheel and support that a pipe can be gripped and cut. The sleeve 26 has the inner end thereof reamed, as at 50ᵃ to support the nut 30, and said sleeve is longitudinally slotted, as at 51ᵃ to provide clearance for the lever 34. The outer end of the sleeve 26 has a strap 52 held in place by screws 53, said strap adding rigidity to the outer end of the sleeve.

When the nut 30 is rotated, the rod 20 is moved to adjust the double jaw 9 relatively to the jaw block 3, whereby the forward ends of the double jaw and the jaw block 3 can be used for gripping a nut and cutting a pipe, while the rear ends are employed for gripping a pipe or object having a rounded surface.

What I claim is:—

1. A wrench of the type described, comprising side plates, a jaw block carried by the outer ends thereof, a double jaw provided with guide bars and plates slidably mounted in said jaw block, side arms carried by the inner ends of said side plates, cross heads arranged between said arms, a sleeve inclosing said side arms and said cross heads, a block fixed in said sleeve, a rod extending through said block, cross heads and said jaw block and having the outer end thereof revolubly connected to said double jaw, and a nut rotatably mounted upon the inner end of said rod with the outer end of said nut arranged within said sleeve and telescoping the inner end of said block.

2. A wrench of the type described, comprising side plates, a jaw block carried by the outer ends thereof, a double jaw provided with guide bars and plates slidably mounted in said jaw block, side arms carried by the inner ends of said side plates, cross heads arranged between said arms, a sleeve inclosing said side arms and said cross heads, a block fixed in said sleeve, a rod extending through said clock, cross heads and said jaw block and having the outer end thereof revolubly connected to said double jaw, a nut rotatably mounted upon the inner end of said rod with the outer end of said nut arranged within said sleeve and telescoping the inner end of said block, a support carried by one of the guide bars of said double jaw, a guide carried by the same bar and through which said rod extends, and a cutter wheel revolubly mounted in said jaw block and confronting said support.

3. A wrench of the type described, comprising side plates, a jaw block carried by the outer ends thereof, a double jaw provided with guide bars and plates slidably mounted in said jaw block, side arms carried by the inner ends of said side plates, cross heads arranged between said arms, a sleeve inclosing said side arms and said cross heads, a block fixed in said sleeve, a rod extending through said block, cross heads and said jaw block and having the outer end thereof revolubly connected to said double jaw, a nut rotatably mounted upon the inner end of said rod with the outer end of said nut arranged within said sleeve and telescoping the inner end of said block, a lever pivotally mounted in one of said cross heads, a pivoted jaw arranged in one end of said jaw block and adapted to be moved by a movement of said lever, and means arranged in said sleeve and engaging the other of said cross heads for holding said lever normally in an extended position.

In testimony whereof I affix my signature in the presence of two witnesses.

FRANK MACHAVA.

Witnesses:
JOHN J. KARABIN,
GEORGE SLAINE.

Copies of this patent may be obtained for five cents each, by addressing the "Commissioner of Patents, Washington, D. C."